United States Patent

[11] 3,607,976

| [72] | Inventors | Henry L. Hsieh;<br>William R. Busler, both of Bartlesville, Okla. |
|---|---|---|
| [21] | Appl. No. | 702,793 |
| [22] | Filed | Feb. 5, 1968 |
| [45] | Patented | Sept. 21, 1971 |
| [73] | Assignee | Phillips Petroleum Company |

[54] COMPOSITIONS FROM ISOCYANATE-TERMINATED POLYDIENES WITH ISOCYANATE-TERMINATED CYCLIC POLYETHERS AND A DIAMINE OR DIOL CHAIN EXTENDER
9 Claims, No Drawings

[52] U.S. Cl. ................................................ 260/859,
260/77.5, 260/94.2
[51] Int. Cl. ............................................... C08g 41/04
[50] Field of Search ............................................ 260/859

[56] References Cited
UNITED STATES PATENTS

| 2,948,707 | 8/1960 | Benning | 260/859 |
|---|---|---|---|
| 3,427,366 | 2/1969 | Verdol | 260/859 |
| 3,514,499 | 5/1970 | Dchollenberger | 260/859 |
| 3,515,772 | 6/1970 | Lubowitz | 260/859 |
| 3,515,773 | 6/1970 | Dahl | 260/859 |
| 3,523,093 | 8/1970 | Stamberger | 260/859 |

OTHER REFERENCES

Gatto, Rubber World, Vol. 154, No. 5 August 1966 TS 1878 I 44 Pages 91, 92, 94, 96, and 97.

*Primary Examiner*—Paul Lieberman
*Attorney*—Young and Quigg

ABSTRACT: Novel polymeric compositions comprise the reaction product of (a) isocyanate-telechelic polymers obtained by the reaction of diisocyanates with hydroxy-telechelic polymers of conjugated dienes or conjugated diene/monovinyl aromatic compound copolymers; (b) isocyanate-telechelic polymers obtained by the reaction of diisocyanates with hydroxy-telechelic polymers of oxiranes, oxetanes, or tetrahydrofurans and (c) a simple diol or diamine.

COMPOSITIONS FROM ISOCYANATE-TERMINATED POLYDIENES WITH ISOCYANATE-TERMINATED CYCLIC POLYETHERS AND A DIAMINE OR DIOL CHAIN EXTENDER

BACKGROUND OF THE INVENTION

We have discovered a novel polymeric composition which can be produced in elastomeric form having good low-temperature properties, oil-resistance, stress-strain properties, and which can be vulcanized with conventional sulfur recipes. These compositions can be employed for the production of elastomeric fibers and films and for mechanical goods such as gaskets and hose. These compositions can also be employed to produce flexible and rigid foams, the flexibility of the final product depending upon the type of polymers employed as starting materials.

It is therefore one object of this invention to provide improved polymeric compositions. It is another object of this invention to provide elastomeric and rigid polymer compositions having attractive low-temperature properties, oil-resistance, and stress-strain properties. It is yet another object of this invention to provide polymeric compositions which can be vulcanized by the use of conventional sulfur recipes.

SUMMARY OF THE INVENTION

In accordance with one embodiment of this invention, isocyanate terminated polymers, i.e., isocyanate-telechelic polymers, (a) obtained from hydroxy-telechelic polymers of conjugated dienes or conjugated diene/monovinyl aromatic compound copolymers and (b) obtained from hydroxy-telechelic polymers of oxiranes, ocetanes or tetrahydrofurans are blended together and reacted with a diamine or diol to produce a polymeric product.

The conjugated dienes employed in preparing the hydroxy-telechelic precursor of polymer (a) contain from four to 12, preferably four to eight, carbon atoms per molecule. Examples of suitable conjugated dienes include 1,3-butadiene, 2-methyl-1,3-butadiene, 2-phenyl-1,3-butadiene, 1,3-pentadiene, 1,3-hexadiene, 2,3-dimethyl-1,3-butadiene, 1,3-octadiene, 3-butyl-1,3-octadiene, -methyl-3-isopropyl-1,3-butadiene, and the like.

The monovinyl-substituted aromatic compounds employed in preparing the hydroxy-telechelic precursor of polymer (a) contain from eight to 20, preferably eight to 16, carbon atoms per molecule. Examples of suitable monovinyl-substituted aromatic compounds include styrene, 1-vinylnaphthalene, 2-vinylnaphthalene, 3-methylstyrene, 4-dodecylstyrene, 4-phenylstyrene, 4-methoxystyrene, 4-dimethylaminostyrene, 4-methoxy-1-vinylnaphthalene, 6-phenoxy-1-vinylnaphthalene, 3,6-bis(dimethylamino)-1-vinylnaphthalene, and the like.

When copolymers of conjugated dienes and monovinyl-substituted aromatic compounds are employed, said copolymers contain from 10 to 90 weight percent conjugated diene based on the copolymer composition. Said copolymers can be either random copolymers or block copolymers. The latter category includes, for example, the block copolymers that can be prepared by sequential addition and polymerization of the separate monomers.

Monomers suitable for the preparation of the hydroxy-telechelic precursor of polymer (b) can be represented by the general formula

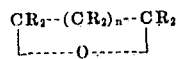

wherein n is 0, 1 or 2, and wherein R is hydrogen, alkyl, alkenyl, cycloalkyl, cycloalkenyl, aryl, alkaryl, or aralkyl radical containing from one to 10 carbon atoms and wherein the total number of carbon atoms does not exceed 40 carbon atoms per molecule. Examples of suitable compounds include oxirane (ethylene oxide), 1,3-epoxypropane (oxetane), 1,4-epoxybutane (tetrahydrofuran), 2,3-dimethyl-2,3-epoxybutane, 1-benzyl-2-phenyl-1,3-epoxypentane, 11,12-didecyl-10,13-epoxyeicosane, 2-(1-cyclohexenyl)-1,4-epoxypentane, 5,7-epoxy-1,9-decadiene, 2-benzyl-1,4-epoxybutane, 1,2-di-p-tolyloxirane, 1-phenyloxirane (styrene oxide), 2,3-dicyclohexyl-1,4-epoxybutane and the like.

For the general purposes of this invention, the isocyanate-terminated polymers will generally have molecular weights in the range of from about 500 to about 10,000. Preferred molecular weights are in the range of 1,000 to 5,000.

The polymers of group (a) can be produced, for example, by polymerizing the conjugated diene, preferably butadiene, or by copolymerizing the conjugated diene and the monovinyl-substituted aromatic monomer, preferably styrene, with an alkali metal initiator as disclosed in U.S. Pat. No. 3,175,997. These polymers are then reacted with oxygen or a vicinal epoxy compound having from two to 30 carbon atoms, preferably ethylene oxide, as disclosed in U.S. Pat. No. 3,175,997, to produce the hydroxy terminated polymers which are then reacted with diisocyanates to produce the isocyanate-telechelic polymers of group (a).

The hydroxy-telechelic precursors for the polymers of group (b), i.e., homopolymers, copolymers or terpolymers of tetrahydrofurans, oxetanes and oxiranes, are in certain instances commercially available polymers such as those diols in table II of Appendix C, page 350, in Polyurethanes: Chemistry and Technology Part I, by J. H. Saunders and K. C. Frisch, Interscience Publishers, New York, 1962.

The two types of hydroxy terminated polymers employed as precursors of the isocyanate-telechelic polymers in this invention are of relatively low molecular weight, generally in the range of 500 to 10,000, and preferably in the range of 1,000 to 5,000. It is preferred that each type of polymer employed as a starting material contain two hydroxy groups located in terminal positions. The conjugated diene polymers most generally used are homopolymers, and, of these materials, liquid polymers are preferred. These polymers render the compositions elastomeric and vulcanizable with sulfur as well as with other well-known vulcanizing agents. The polyether-type polymer, prepared from a cyclic ether, provides strength for the compositions that is not obtained if the conjugated diene polymers are used alone.

Any of a wide variety of organic diisocyanates can be employed for converting the hydroxy-terminated polymers to isocyanate-terminated polymers. Representative compounds include toluene-2,4-diisocyanate, toluene-2,6-diisocyante, 4,4'-diphenylmethane diisocyanate, and the like.

These diisocyanates are reacted with the hydroxy-telechelic precursors for the polymers of groups (a) and (b) in accordance with generally well-known procedures for reacting diisocyanates with hydroxyl groups. Illustrative of these procedures is the method described in U.S. Pat. No. 2,511,544 wherein organic diisocyanates are reacted with glycols in a boiling indifferent solvent such as dioxane, chlorobenzene, toluene, and the like.

The diamines and diols which are reacted with the isocyanate-telechelic polymers of this invention can be represented by the general formula R'(Q)$_2$ wherein Q is

or -OH and wherein R' is an alkylene, cycloalkylene, alkenylene, cycloalkenylene, or arylene radical, or combinations thereof, containing from two to 20 carbon atoms and wherein R'' is hydrogen, alkyl, cycloalkyl, or alkaryl radical containing from one to eight carbon atoms. Examples of suitable diamines include eight -ethanediamine, 1,10-decanediamine, 1,20-eicosanediamine, 1,6-cyclododecanediamine, 1,4-cyclohexanediamine, 3-octene-1,8-diamine, cyclooctene-4,7-diamine, 1,3-benzenediamine, 6,7-dipentyl-1,4-naphthalenediamine, N,N'-dimethyl-1,2-ethanediamine, N-methyl-1,2-ethanediamine, N,N'-dicyclohexyl-1,4-benzenediamine, N,N'-dibenzyl-1,4-cyclohexyldiamine, N,N'-dioctyl-10-eicosene-1,20-diamine, N-(4-methylbenzyl)-3,6-cyclohexenediamine, N,N'- dicyclooctyl-1,3-propanediamine, and the like. Examples of suitable diols include ethanediol (ethylene glycol), 1,4-butanediol, 1,20-eicosanediol, 1,4-cyclohexanediol, 3,8-cyclododecenediol, 6,7-dipentyl-1,4-naphthalenediol, 3-octene-1,8-diol, 1,4-bis(hydroxymethyl)benzene, and the like.

When said diamines or diols are employed according to this invention, a small amount of monoamine or organic monohydroxy compound can be added as desired to regulate the molecular weight of the products.

The molar ratio of said diamine or diol to the terminal isocyanate groups of said polymers is preferably 1.0 to 1:2, i.e., the amount of diamine or diol employed is at least sufficient to react with all the terminal isocyanate groups although a slight excess can be employed.

The reaction of these three materials which results in the formation of the composition of this invention can be conducted at a broad range of temperatures, usually from about 0° to about 250° C. The choice of temperature will, of course, depend upon the rate at which it is desired to conduct the conversion, the physical characteristics of the reactant and the prospect of decomposing of high molecular weight reactants when employed. For these reasons, it is presently preferred to employ temperatures within the range of from about 50° to about 150° C.

At these temperatures, the reaction can be conducted in the absence of catalysts. However, we have found that considerable advantage can be realized in most instances by reacting the components above-described in the presence of a promoting amount of an initiator such as tertiary amines, e.g., triethylamine, and metal salts, e.g., dibutyltin diacetate.

The ratios of isocyanate-telechelic polymers (a) and (b) utilized in preparing the compositions of this invention can be varied over a fairly broad range, generally from 10 to 90 parts by weight of polymer (a) to 90 to 10 parts by weight of polymer (b). However, the preferred range of ratios is from 30 to 70 parts by weight of polymer (a) to 70 to 30 parts by weight of polymer (b).

EXAMPLE I

Two hydroxy-terminated, i.e., hydroxy-telechelic, polymers, one prepared from butadiene and the other from tetrahydrofuran, were each treated with toluene-2,4-diisocyanate and blended in an approximately equimolar ratio. The mixture was then treated with 1,2-ethanediamine. The hydroxy-telechelic polybutadiene had the following properties: hydroxy content, 1.51 weight percent; molecular weight, 2,200. The hydroxy-telechelic poly(tetrahydrofuran) was obtained from the Quaker Oats Company (marketed as QO POLYMEG 1,000) and described as a diprimary diol with the structure HO (-CH$_2$CH$_2$CH$_2$CH$_2$O-)$_n$H, a molecular weight of about 1,000, and a hydroxy number of 107–118. It was a waxy solid.

The amounts of materials used for the diisocyanate treatment and conditions for the reactions were as follows:

|  | 1 | 2 |
|---|---|---|
| Hydroxy-telechelic polybutadiene, mole | 0.06 | |
| Hydroxy-telechelic poly(THF), mole | | 0.149 |
| Hallcomid M-6$_{(a)}$ (diluent), grams | 500 | 500 |
| Toluene-2,4-diisocyanate (TDI), mole | 0.09 | 0.223 |
| TDI: Hydroxy polymer mole ratio | 1.5:1 | 1.5:1 |
| Temperature, °C. | 80 | 80 |
| Time, hours | 2 | 2 |

(a) A mixture of saturated N,N-dimethyl fatty acid amides, N,N-dimethylcaproamide (90 percent), and N,N-dimethylcaprylamide (90 percent).

The reactions were conducted in an atmosphere of nitrogen and the reactants were stirred throughout that 2-hour period.

A portion of each reaction mixture [30.3 g. of isocyanate-treated hydroxy-telechelic polybutadiene and 13.7 g. of isocyanate-treated hydroxy-telechelic poly(tetrahydrofuran)] was charged to a reactor and heated to 80° C. Ethylenediamine was added dropwise over a 45-minute period until an amount slightly in excess of that required to react with all the isocyanate groups was introduced. The reaction was continued for another 45 minutes. At the end of this period, approximately one part by weight per 100 parts by weight of polymer of 2,2'-methylene-bis(4-methyl-6-tert-butylphenol) was added as a 10 weight percent solution in isopropyl alcohol. The polymer was then coagulated in methyl alcohol, separated, and dried. Unsaturation, determined by iodine monochloride titration as described in U.S. Pat. No. 3,299,016, column 9, line 57 ff, was 52.4 percent. The product was millable and elastomeric. It had a green tensile strength of 700 p.s.i. and an elongation of approximately 1,000 percent when determined according to ASTM D-412-62 T.

EXAMPLE II

The hydroxy-telechelic polymers described in example I were each treated with 4,4'-diphenylmethane diisocyanate. The amounts of materials used were as follows:

|  | 1 | 2 |
|---|---|---|
| Hydroxy-telechelic polybutadiene, mole | 0.035 | |
| Hydroxy-telechelic poly(THF), mole | | 0.05 |
| Hallcomid M-6 (diluent), grams | 500 | 500 |
| 4,4'-Diphenylmethane diisocyanate (DPMDI), mole | 0.070 | 0.10 |
| DPMDI:Hydroxy polymer mole ratio | 2:1 | 2:1 |

In each of these runs the diisocyanate and diluent were charged to a reactor and heated to 85° C. A solution of the hydroxy-telechelic polymer in Hallcomid M-6 was added dropwise, with stirring. Stirring and heating were continued for 1 hour after all the hydroxy-telechelic polymer was introduced. The reactions were conducted in an atmosphere of nitrogen and the polymer solutions were stored under nitrogen until used.

A reactor was purged with nitrogen and the isocyanate-treated polymers, [58 g. of isocyanate-treated hydroxy-telechelic polybutadiene and 32.4 g. of isocyanate-treated hydroxy-telechelic poly(tetrahydrofuran)], in solution, were charged. The temperature was adjusted to 85°and ethylenediamine was added dropwise, with stirring, as in example I until a slight excess was introduced. The reaction mixture was stirred two more hours while the temperature was maintained at 85° C. The product was recovered as in example I. It was a millable, elastomeric material. It was compounded in the following gum stock recipe:

|  | Parts by Weight |
|---|---|
| Polymer | 100 |
| Stearic acid | 0.2 |
| Altax$^{(a)}$ | 3 |
| Captax$^{(b)}$ | 1 |
| Caytur 4 $^{(c)}$ | 0.35 |
| Sulfur | 1.5 |

(a) Benzothiazyl disulfide.
(b) 2-Mercaptobenzothiazole.
(c) Activator: ZnCl$_2$.2-mercaptobenzothiazolyl/disulfide complex (duPont).

The stock was cured 30 minutes at 307° F. Tensile strength and elongation were 1,135 and 235, respectively. These values were determined by the procedure of ASTM D-412-62 T.

We claim:
1. A polymeric composition comprising the reaction product of from about 10 to about 90 weight percent of (a) an isocyanate-telechelic polymer selected from the group consisting of conjugated diene homopolymers, conjugated diene copolymers, and conjugated diene/monovinyl-substituted aromatic compound copolymers; from about 90 to about 10 weight percent of (b) an isocyanate-telechelic polymer selected from homopolymers and copolymers of cyclic ethers represented by the general formula

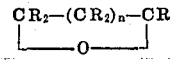

wherein $n$ is 0, 1 or 2, and wherein R is hydrogen, alkyl, alkenyl, cycloalkyl, cycloalkenyl, aryl or combinations thereof containing from one to 10 carbon atoms and wherein the total number of carbon atoms is 40 or less per molecule; and (c) a compound selected from the group consisting of diamines and diols represented by the general formula $R'(Q)_2$ wherein Q is

or -OH and wherein R' is an alkylene, cycloalkylene, alkenylene, cycloalkeylene, or arylene radical, or combinations thereof, containing from two to 20 carbon atoms and wherein R'' is alkyl, cycloalkyl, or alkaryl radical containing from one to eight carbon atoms and wherein the ratio of said diamines and diols to said terminal isocyanate groups is from about 1.0:1 to 1.2:1.

2. The composition of claim 1 wherein isocyanate-telechelic polymers (a) and (b) have molecular weights within the range of from about 500 to 10,000 and said diamines and diols are represented by the general formula $R'(Q)_2$ wherein Q is

or -OH and wherein R' is an alkylene, cycloalkylene, alkenylene, cycloalkenylene, or arylene radical, or combinations thereof, containing from two to 20 carbon atoms and wherein R'' is hydrogen, alkyl, cycloalkyl, or alkaryl radical containing from one to eight carbon atoms.

3. The composition of claim 2 wherein said isocyanate-telechelic polymers (a) and (b) have molecular weights within the range of from 1,000 to 5,000.

4. The composition of claim 2 wherein said conjugated diene has from four to 12 carbon atoms, said monovinyl-substituted aromatic compounds have from eight to 20 carbon atoms, said cyclic ether has from two to 40 carbon atoms, and said diamine or diol has from two to 28 carbon atoms.

5. The composition of claim 1 wherein said conjugated diene is 1,3-butadiene.

6. The composition of claim 1 wherein said conjugated diene is 1,3-butadiene and said cyclic ether is 1,4-epoxybutane (tetrahydrofuran).

7. The composition of claim 1 wherein said cyclic ether is 1,4-epoxybutane.

8. The composition of claim 1 wherein said diamine is ethylenediamine.

9. The composition of claim 1 wherein said conjugated diene is 1,3-butadiene, wherein said cyclic ether is 1,4-epoxybutane (tetrahydrofuran), wherein said diamine is ethylene diamine and wherein equimolar amounts of isocyanate-telechelic polybutadiene and isocyanate-telechelic poly(tetrahydrofuran) are reacted with said ethylenediamine employed in an amount slightly in excess of the amount required to react with all the terminal isocyanate groups.